United States Patent [19]

Bader et al.

[11] Patent Number: 4,475,983

[45] Date of Patent: Oct. 9, 1984

[54] BASE METAL COMPOSITE ELECTRICAL CONTACT MATERIAL

[75] Inventors: Frank E. Bader, Bexley, Ohio; Martin L. Green, New Providence, N.J.

[73] Assignee: AT&T Bell Laboratories, Murray Hill, N.J.

[21] Appl. No.: 414,595

[22] Filed: Sep. 3, 1982

[51] Int. Cl.[3] ............................ C23F 1/02; B44C 1/22; C03C 15/00; C03C 25/06

[52] U.S. Cl. ...................................... 156/656; 75/228; 29/875; 156/630; 156/634; 156/643; 156/646; 156/664; 156/667; 204/129.1; 204/192 E; 428/553

[58] Field of Search ................ 428/553; 264/111, 104; 156/630, 634, 643, 646, 656, 664, 667; 29/874–879; 75/200–206, 173 A, 228, 235, 236, 240; 204/129.1, 192 E

[56] References Cited

U.S. PATENT DOCUMENTS

| | | | |
|---|---|---|---|
| 2,504,906 | 4/1950 | Tremblay | 428/550 X |
| 3,778,257 | 12/1973 | Davies | 75/173 A |
| 3,841,869 | 10/1974 | Davies | 75/206 |
| 3,920,452 | 11/1975 | Davies | 75/200 |

FOREIGN PATENT DOCUMENTS 8001555 1/1981 Netherlands .

OTHER PUBLICATIONS

Electrocomponent Science and Technology, vol. 2, 1976, pp. 259–261, Silver–Ruthenium Dioxide Contacts by D. J. Pedder.

*Primary Examiner*—William A. Powell
*Attorney, Agent, or Firm*—Eugen E. Pacher; Richard D. Laumann

[57] ABSTRACT

A composite contact material for light-duty electrical contacts is formed by combining, typically by powder-metallurgical techniques, a matrix metal and particles of a conductive material that is typically harder and more corrosion resistant than the matrix metal, and by removing, in a differential material removal step, some of the matrix metal from a surface of the composite, thereby producing a "sandpaper" surface with a substantial number of the particles projecting by a substantial amount above the matrix metal surface. Typical matrix metals are copper, copper alloys, or nickel, and typical particle materials are metals such as Ru, Re, Os, and intermetallics, oxides, borides, nitrides, carbides, silicides, and phosphides of such metals as Al, Ti, Ni, Nb, Mo, Ru, Ta, W, Re, or Os. Particle size is typically between about 0.1 μm and 100 μm, preferably less than 10 μm, and the particle volume fraction is typically between about 1% and 50%, preferably between 5% and 30%. Any appropriate differential material removal method, including chemical, plasma, sputter, thermal, and electrolytic etching, can be used.

15 Claims, 2 Drawing Figures

BASE METAL COMPOSITE ELECTRICAL CONTACT MATERIAL

FIELD OF THE INVENTION

This invention pertains to articles comprising a composite electrical contact material, and to methods for making such composite material.

BACKGROUND OF THE INVENTION

Electrical contacts are a ubiquitous feature of electrical apparatus and installations and are present, for instance, in such components as switches, plugs, relays, and commutators. Electrical contacts can be designed to carry very small currents, of the order of milliamperes or even less, and to operate in circuits having very small open circuit voltages, of the order of a few volts. On the other hand, heavy-duty contacts can carry kiloamperes of current and operate in circuits having perhaps many kilovolts of open circuit voltage. The technologies involved under these two sets of conditions are quite different, and since this application deals with light-duty electrical contacts, our discussion will be restricted thereto.

Because light-duty electrical contacts typically are used in relatively low voltage applications, it is important that the voltage drop across the contact be small and, perhaps even more importantly, remain substantially constant with time. This voltage drop is, of course, a manifestation of the nonzero resistance of the contact to the flow of electricity, the so-called contact resistance. The contact resistance is comprised of at least two components, namely, the construction resistance which is, inter alia, due to the typically relatively small actual current carrying area of even an ideally clean contact, and the so-called film resistance due to the presence of a contaminating film on real contacts. Whereas it is difficult to change the former component, the latter can be reduced through application of appropriate measures.

The prior art knows a variety of approaches towards eliminating or reducing film resistance. Probably the most commonly employed approach is the use of noble metal contacts. A typical noble metal contact layer consists of a thin gold-rich electrodeposited alloy film on a base metal structure. Such contacts are generally very reliable, can be made to have good wear properties, and typically have stable and low contact resistance. However, the recent rise and fluctuation in the price of gold has led to a search for contact materials that do not contain gold.

The consumption of gold can be reduced by the use of thinner gold contact layers. However, it has been found that, when gold is deposited in a layer less than about 1 μm thick, it is porous and does not withstand corrosion well. A prior art method of dealing with this shortcoming uses a thin layer of noble metal, e.g., gold, not more than 0.2 to 2 μm thick, in combination with a layer of a mixture comprising hard electrically conducting particles (e.g., ruthenium (Ru)) in a binder of a pasty consistency, e.g., paraffin or vaseline. The particles are to have such hardness that they are capable of penetrating through any local corrosion film on the mating noble metal surface. The minimum diameter of the particles is to be no less than the maximum thickness of the insulating layer covering the contact area, and the number of particles is to be so high that the contact resistance becomes sufficiently low. See Dutch Pat. No. 8,001,555.

Another approach was described by D. J. Pedder, *Electric Components Science and Technology,* Gordon and Breach Publishers, Ltd., Volume 2, pp. 259–261 (1976). The approach consists in the use of a powder-metallurgically produced composite consisting of ruthenium oxide ($RuO_2$) particles embedded in a silver matrix. The composite is produced by mixing silver and ruthenium particles in desired proportions, compacting at a pressure of 10 tons per square inch, sintering and oxidizing the ruthenium particles to $RuO_2$ either simultaneously or sequentially. The composite is then coined to increase the density to a value approaching the theoretical density.

The thus produced contact surfaces contain $RuO_2$ particles both in, and protruding from, the silver surface. Contacts formed from this composite were tested and found to have low and relatively stable resistance when used in a corrosive atmosphere. In explanation of this observation, Pedder suggests that small islands of a nontarnishing conducting material provide conducting paths through an otherwise tarnished surface. It is also suggested that the oxide particles, being harder than the corrosion layer formed on the silver surfaces, may rupture such films on the opposing contact surface.

The above prior art method substantially relies on the volume increase attendant the formation of $RuO_2$ from Ru to result in the projection of some particles above the surface of the silver matrix. It is thus restricted with regard to possible matrix materials and embedded particle material. The method is also typically restricted to relatively low concentrations of $RuO_2$ particles, due to, inter alia, the deformation and volume change of the composite material resulting from the volume change of the embedded particles. Furthermore, the method permits only limited control of surface roughness. See also U.S. Pat. No. 3,778,257 issued Dec. 11, 1973 to T. A. Davies, for "Light-Duty Electrical Contact of Silver and Ruthenium Oxide".

It thus appears that a method for producing composite light-duty contact material that is applicable to a large group of matrix materials, including base metals such as copper, that permits control of the resulting surface condition of the composite, and that typically yields dimensionally stable parts is not taught by the prior art, although such a method would be of substantial economic and technological interest.

SUMMARY OF THE INVENTION

Disclosed is a method for producing an article containing an electrical contact that comprises a composite material. The composite is typically formed by a powder-metallurgical (P-M) process from a powder mixture comprising a matrix metal, typically a base metal having good electrical conductivity, and electrically conducting particles, the particles being substantially harder and more corrosion resistant than the matrix metal, and also harder than the common corrosion products of the matrix metal, e.g., oxides or sulfides of the metal.

The method comprises carrying out, subsequent to the formation of the composite, a differential material removal step, e.g., a wet etching step, on at least one surface of the composite, with the removal rate of the matrix metal being substantially greater than the particle material removal rate, thereby creating a "sandpaper" surface from which a substantial fraction of the particles in the surface region of the composite projects above the plane of the surface.

The inventive method permits close dimensional control of the composite parts formed thereby since the embedded particles do not experience any substantial volume change, and, furthermore, it permits control of the roughness of the contact surface through, inter alia, control of the surface removal step.

A composite according to the invention typically has a particle volume fraction between about 1% and about 50%, preferably between 5% and 30%, with the particles typically having an average size between about 0.1 μm and about 100 μm, preferably less than 10 μm, and a substantial fraction, typically at least 10%, of the particles that intersect the matrix surface are projecting above the surface by at least 25% of the average particle diameter.

The matrix metal is typically a base metal or base metal alloy having good electrical conductivity, e.g., copper, nickel, phosphor bronze, or copper-nickel-tin alloy, and the conducting particles are more corrosion-resistant than the matrix metal. Exemplary particle materials are Ru, $RuO_2$, $Ru_2B_3$, $Ru_2W_3$, $Ru_2Mo_5$, Re, $Re_3B_2$, $Re_3W_2$.

Any appropriate differential material removal method is contemplated to be within the scope of the invention. Exemplary methods are etching by means of liquid or gaseous etchants or by means of partially ionized gases, thermal etching, electrolytic etching, electropolishing, and sputter etching.

DETAILED DESCRIPTION

Figure 1:
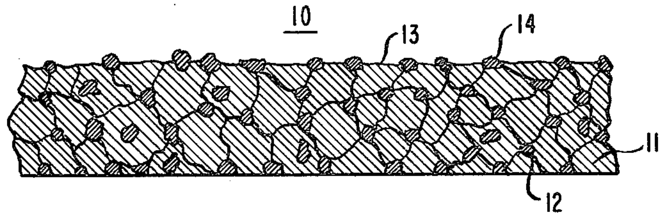
FIG. 1 schematically shows in cross section a composite according to the invention, and FIG. 2 schematically shows a contact structure formed by inlaying of a strip of inventive composite.

The inventive method comprises producing a composite from at least two materials, a first material which typically is the major constituent of the composite, to be referred to as the matrix material, and a second material in particulate form which is embedded in a matrix consisting substantially of the first material. The composite material may contain, in addition to the matrix material and the particles embedded therein, other constituents, for instance, constituents designed to improve material properties such as sinterability or electrical stability, but, for ease of exposition, the discussion herein is in terms of a two-constituent composite. It will be understood, however, that the scope of the invention is not so limited.

The matrix metal is a metal having good electrical conductivity, typically a base metal such as copper, nickel, or a base metal alloy, and the particle material an electrically conducting material that is typically substantially harder than the matrix metal or the corrosion products formed by the matrix metal in environments typically encountered by electrical contacts according to the invention, typically oxides or sulfides. Furthermore, the particle material is typically selected to be more corrosion-resistant than the matrix metal. Exemplary of classes of materials which contain advantageously used particle materials are metals (e.g., Ru, Re, Os) and intermetallics (e.g., $Ru_2W_3$, $Ru_2Mo_5$, $Re_3W_2$), and oxides, borides, nitrides, carbides, silicides and phosphides of such metals as Al, Ti, Ni, Nb, Mo, Ru, Ta, W, Re, or Os.

A further requirement is that, under the conditions of composite formation, the particle material be substantially insoluble in the matrix material and does not form an intermetallic compound with it, to the extent that during formation of the composite at most a small fraction of the particle material, less than about 10% by volume, preferably less than about 3%, of the particle material, is lost. This requirement assures that the composite in its final state will contain a sufficient concentration of particles to yield contacts having acceptably low surface resistance. For instance, one of the preferred particle materials, Ru, has negligible solubility in, e.g., Cu, Pb and Ag, but appreciable solubility in, e.g., Cr, Fe, Nb, Ni, and V, and forms intermetallics with, e.g., Al, Mo, Sn and W. Thus Ru typically is not suitable as a particle material in, e.g., a Ni or Al matrix if composite formation entails a relatively high temperature step.

The composite can be formed by any appropriate technique, including dispersion of the particles of the second material in the melt of the first material by either conventional fusion metallurgy or by a local melting technique, e.g., laser injection melting. However, P-M techniques form a preferred approach to composite formation.

P-M techniques comprise mixing of powders (e.g., blending, ball milling, or mechanical alloying), powder consolidation (e.g., compacting in hard dies, isostatic compacting, roll compacting, formation of endless strip by the Emley and Deibel method, or injection molding) and composite densification (e.g., sintering in vacuum or under a protective atmosphere), or hot consolidation of powder (e.g., hot rolling, hot pressing, hot extrusion, hot isostatic pressing, or hot forging). Such techniques are well known to those skilled in the art, and will not be further discussed herein. See, for instance, F. V. Lenel, *Powder Metallurgy,* Metal Powder Industries Federation, Princeton, N.J. (1980).

The average size of the conductive particles is typically between about 0.1 μm and about 100 μm, preferably less than about 10 μm. By "particle size" we mean herein the diameter of a sphere of the material which has the same settling velocity in a viscous liquid as the powder particle. The lower limit of particle size is determined by the expected thickness of the corrosion film on a mating contact surface. The particle size typically should be at least about twice, preferably at least about four times, the expected film thickness. Such films, e.g., oxide or sulfide films, formed on base metal contacts under mildly corrosive conditions are typically between about 0.01 μm and about 0.1–0.5 μm thick. The upper limit of particle size is due to the need for a large number of contact points to assure a stable and low value of contact resistance. The particle shape is typically arbitrary, but angular or jagged shape is often advantageous, since particles of such shape are especially effective in penetrating corrosion layers on opposing contact surfaces.

The particle concentration in the composite typically is between about 1% and about 50% by volume, preferably between about 5% and 30%. This assures that a significant number of particles will be located at or close to the surface of the composite, resulting in a sufficient number of contact points to yield a low and stable value of contact resistance. On the other hand, the presence of at least 50% b.v. of matrix metal typically assures mechanical integrity of the composite.

Subsequent to composite formation a "sandpaper" structure is produced on at least one surface of the composite by a process comprising a differential material removal step. "Differential material removal" refers herein to any process that removes the matrix material at a rate that is higher than the rate at which it removes particle material. Any appropriate differential material removal process is considered to be within the scope of the invention. Exemplary processes are wet etching, dry etching by means of an un-ionized gas or an at least partially ionized gas (e.g., plasma etching), sputter etching, electrolytic etching, electropolishing, or thermal etching. The process parameters, e.g., etchant concentration and temperature, and etching time, typically are chosen to result in removal of enough matrix material such that at least a substantial fraction, typically at least about 10%, of the particles intersecting the surface of the composite are, after completion of the removal step, projecting above the new matrix surface by at least about 25% of the average particle size, thereby assuring good electrical contact properties of the surface. The differential material removal step can occur at any appropriate convenient point of the manufacturing process subsequent to composite formation, and can be followed by application to the surface of an appropriate thin layer of protective material, e.g., a polymer, provided that the projecting particles can penetrate the layer.

FIG. 1 schematically shows a cross section through a composite 10 according to the invention. Particles 12 of a particle material are embedded within matrix 11, both at grain boundaries and within matrix metal grains, with particles 14 intersecting surface 13 of the matrix and projecting above that surface.

Figure 2:
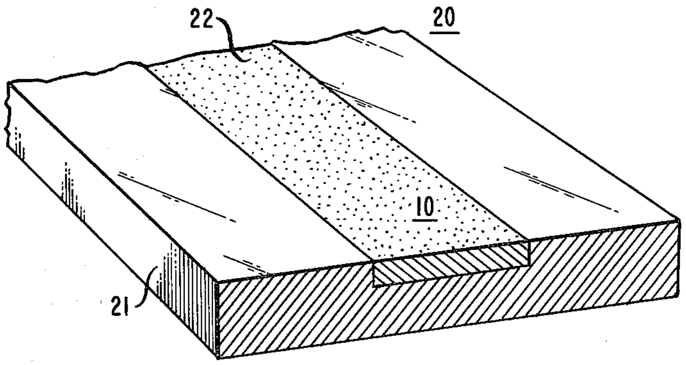

The composite with a "sandpaper" surface can be incorporated into light-duty electrical contacts in any appropriate manner and by any appropriate technique, and all of these are contemplated to be within the scope of the invention. For instance, a strip of the contact material can be fastened to a conducting support structure by, e.g., welding, soldering, inlaying, or by means of a conductive adhesive. This is schematically depicted in FIG. 2, where electrical contact 20 comprises support structure 21 and composite 10, inlaid into 21, with sandpaper surface 22 forming the contact surface. In an application involving inlaying the material removal step preferably is carried out subsequent to inlaying.

A preferred application of the inventive method is the production of light-duty contacts comprising a Cu(or copper alloy)-Ru or $RuO_2$ composite. The composite canv advantageously be formed by warm-rolling mechanically alloyed matrix material and Ru or $RuO_2$ powders. The resulting material consists of Ru or $RuO_2$ particles, advantageously of submicron size, distributed throughout the matrix, with this nonequilibrium microstructure being preserved during subsequent processing steps. Removal of surface matrix material during a differential etching step gives rise to a sandpaper structure in which the hard, refractory and conductive Ru or $RuO_2$ particles, now in part protruding from the surface, serve as the electrical contacts with a mating surface, with the matrix supporting these particles and providing electrical continuity. Preparation of composites for such application of the inventive method will now be exemplified.

EXAMPLE I

A Cu—15% by volume Ru composite was prepared by mechanically alloying, in a steel jar with hardened steel balls, −100 mesh Cu and −200 mesh Ru powder for 4 hours. The volumetric ratio of balls to powder was about 10:1. The procedure resulted in an alloyed powder consisting of a fine distribution of Ru particles, of mean particle size about 1 μm, in Cu. The alloyed powder, after annealing at 500° C. for 1 hr. in $H_2$, was pressed into a bar shape at a pressure of 4.8 $10^4$ psi (33 $10^7$ Pa), and the bar hot rolled at about 900° C. to a true reduction strain of −0.912 (density 97.5% of theoretical), followed by cold rolling, with intermittent anneals at 900° C. in $H_2$, to yield 0.010 inch strip stock (density 99.6% of theoretical). Surface copper was removed by means of a 30 sec. etch in room temperature 1:1 $HNO_3$/$H_2O$, resulting in a "sandpaper" surface structure with average roughness of 0.6 μm. The thus prepared surface had a contact resistance $R_c$ of about 2 mΩ (as determined by measurements in accordance with American Society for Testing and Materials (ASTM) Standard B 667-80, using a probe consisting of U-shaped 20 mil diameter gold wire, with a contact pressure of about 100 gm, in a circuit having an open circuit voltage of less than 20 mV), which gradually rose to 5 mΩ during 6 months' exposure to air. One week exposure to a sulfidizing atmosphere at 85° C. with 85% relative humidity caused $R_c$ to increase to 3 mΩ.

EXAMPLE II $B_3Ru_2$ powder was prepared by crushing an arc-cast ingot of this composition, and a Cu—10% b.v. $B_3Ru_2$ composite formed by a procedure substantially as described in Example I, except that the bar-shaped pressed material was cold rolled into strip stock after a 2 hr/1000° C. $H_2$ sinter. After differential etching in room temperature 1:1 $HNO_3/H_2O$ that resulted in a sandpaper surface structure similar to that described in Example I, the material had $R_c$=5 mΩ, which gradually increased to about 10 mΩ during 6 months in air.

EXAMPLES OF DIFFERENTIAL SURFACE REMOVAL

A sandpaper surface according to the invention is produced in composites with Cu matrix metal by, for instance, (a) etching in a saturated aqueous solution of $CrO_3$ for about 5–30 sec.;

(b) etching in a solution of 100 ml ethanol +35 ml HCl+5 gm $FeCl_3$ for about 1 min.;

(c) electrolytic etching for about 10 sec. in a solution of 90 ml $H_2O$+10 ml $H_3PO_4$, with 5 V (DC) applied, and using a Cu cathode.

Other methods and media that can be used in the differential material removal step according to the invention are well known to those skilled in the art, and will not be discussed further. See, for instance, *Metals Reference Book*, C. J. Smithells, Plenum Press, N.Y., 4th Edition (1967) incorporated herein by reference.

What is claimed is:

1. Method for producing an article comprising an electrical contact comprising a composite material, the method comprising (a) forming the composite comprising a matrix metal and an electrically conducting particle material in particulate form, characterized in that (b) the matrix metal is a base metal and the particle material is harder and more corrosion resistant than the matrix metal and the oxides and sulfides of the matrix metal, (c) the particles of the particle material have an average diameter between about 0.1 μm and about 100 μm, and the volume fraction of particle material in the composite is between about 1% and about 50%, and the method further comprises (d) carrying out, subsequent to (a), a differential material removal step on at least one surface of the composite, with the removal rate of the matrix metal being greater than the removal rate of the particle material, thereby creating a "sandpaper" surface having particles projecting above the matrix surface.

2. Method of claim 1, wherein a substantial fraction of the projecting particles project above the matrix surface by at least about 25% of the average particle diameter.

3. Method of claim 2, wherein the composite is formed by a process comprising a powder metallurgical procedure.

4. Method of claim 3, wherein the base matrix metal is selected from the group consisting of copper, copper alloys, and nickel.

5. Method of claim 4, wherein the particle material is selected from the group consisting of the metals Ru, Re, and Os, and intermetallics, oxides, borides, nitrides, carbides, silicides, and phosphides of Al, Ti, Ni, Nb, Mo, Ru, Ta, W, Re, and Os.

6. Method of claim 5, wherein the particles have an average size not greater than about 10 μm.

7. Method of claim 6, wherein the volume fraction of particle material in the composite is between about 5% and 30%.

8. Method of claim 1, wherein the differential material removal step comprises contacting the surface with a reactive medium.

9. Method of claim 8, wherein the reactive medium is a liquid chemical etching medium.

10. Method of claim 8, wherein the reactive medium is a gaseous etching medium.

11. Method of claim 10, wherein the gaseous medium is at least partially ionized.

12. Method of claim 1, wherein the differential material removal step comprises sputtering.

13. Method of claim 1, wherein the differential material removal step comprises thermal etching.

14. Method of claim 1, wherein the differential material removal step comprises electrolytic etching or electropolishing.

15. Method of claim 7, wherein the matrix metal consists substantially of copper, the particle material consists substantially of ruthenium, and the differential material removal step comprises contacting the surface with a liquid chemical etching medium.

* * * * *